United States Patent
Reinke et al.

(10) Patent No.: US 9,477,630 B2
(45) Date of Patent: Oct. 25, 2016

(54) METHOD OF CONNECTING A PCIE BUS EXTENSION SYSTEM

(71) Applicant: OCZ Storage Solutions, Inc., San Jose, CA (US)

(72) Inventors: Karl Reinke, Santa Clara, CA (US); Dokyun Kim, Fremont, CA (US); William Allen, Cupertino, CA (US)

(73) Assignee: Toshiba Corporation, Tokyo (JP)

( * ) Notice: Subject to any disclaimer, the term of this patent is extended or adjusted under 35 U.S.C. 154(b) by 0 days.

(21) Appl. No.: 14/175,627

(22) Filed: Feb. 7, 2014

(65) Prior Publication Data

US 2014/0156897 A1   Jun. 5, 2014
US 2016/0154761 A9   Jun. 2, 2016

Related U.S. Application Data

(62) Division of application No. 13/205,300, filed on Aug. 8, 2011, now Pat. No. 8,693,208.

(60) Provisional application No. 61/371,325, filed on Aug. 6, 2010.

(51) Int. Cl.
| | |
|---|---|
| *G06F 13/00* | (2006.01) |
| *G06F 13/42* | (2006.01) |
| *G06F 1/18* | (2006.01) |
| *G06F 13/40* | (2006.01) |

(52) U.S. Cl.
CPC ........... *G06F 13/4221* (2013.01); *G06F 1/185* (2013.01); *G06F 13/4068* (2013.01); *Y10T 29/49117* (2015.01)

(58) Field of Classification Search
CPC ............................ G06F 13/24; G06F 13/4022
USPC .................................. 710/301–306; 361/748
See application file for complete search history.

(56) References Cited

U.S. PATENT DOCUMENTS

| | | | |
|---|---|---|---|
| 2008/0065805 A1* | 3/2008 | Wu et al. ...................... 710/301 |
| 2008/0155156 A1* | 6/2008 | Mussatt ............... G06F 13/405 |
| | | | 710/301 |
| 2011/0182216 A1* | 7/2011 | Ono et al. ..................... 370/282 |
| 2012/0260015 A1* | 10/2012 | Gay et al. ..................... 710/301 |

OTHER PUBLICATIONS

Hewlett-Packard Developement Company, L.P. , "Mini SAS 4i Adapter installation", 2009.*

* cited by examiner

*Primary Examiner* — Tim T Vo
*Assistant Examiner* — Kim T Huynh
(74) *Attorney, Agent, or Firm* — White & Case LLP

(57) ABSTRACT

A PCIe bus extension system, method, interface card and cable for connecting a PCIe-compliant peripheral device to a PCIe bus of a computer system. The interface card includes a printed circuit board, an edge connector adapted for insertion into a PCIe expansion slot on a motherboard of the computer system for transmitting PCIe signals between the motherboard and the interface card, an interface port configured to mate with a connector of the cable, and a logic integrated circuit on the printed circuit board, the logic integrated circuit functionally connecting the edge connector with the expansion slot and amplifying and propagating clock and data PCIe signals therebetween that are compliant with a PCIe standard. The interface card and cable lacks the capability of transmitting power therethrough to a PCIe-compliant peripheral device connected to the interface card through the interface port.

6 Claims, 6 Drawing Sheets

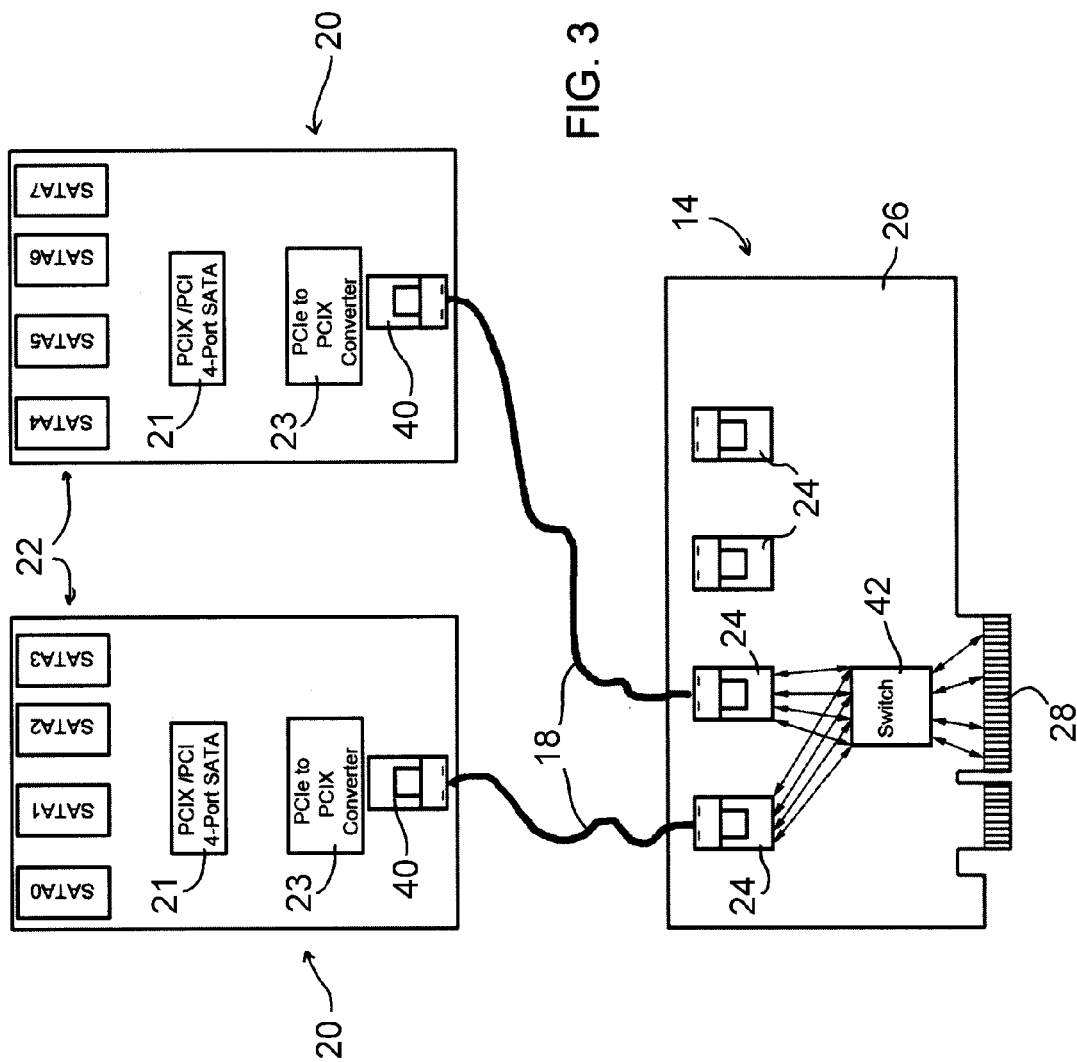

METHOD OF CONNECTING A PCIE BUS EXTENSION SYSTEM

CROSS REFERENCE TO RELATED APPLICATIONS

This application is a division patent application of co-pending U.S. patent application Ser. No. 13/205,300, filed Aug. 8, 2011, which claims the benefit of U.S. Provisional Application No. 61/371,325, filed Aug. 6, 2010, the contents of which are incorporated herein by reference.

BACKGROUND OF THE INVENTION

The present invention generally relates to PCI Express (PCIe) technology, and in particular a PCIe bus extension system and method for adapting PCIe technology to current and future computer systems.

PCIe, formerly known as $3^{rd}$ generation I/O (3GIO), has replaced the former peripheral component interconnect (PCI) parallel multi-drop bus as the main interconnect within current computer systems. In contrast to PCI, PCIe uses multiple lanes in parallel for each link, wherein each link constitutes a serial point-to-point connection comprising differential pairs for sending and receiving data in full duplex mode.

The currently prevalent PCIe 2.x standard features 500 MB/sec bandwidth per differential pair. In a PCIe 8x configuration (eight lanes), this results in a maximum of 8 GBs data transfers using concurrent send and receive transactions. The bandwidth of each PCIe link may be linearly scaled by adding signal pairs into a multi-lane configuration that can be custom tailored to the target (peripheral) device. Likewise, a multi-lane link may be split into several different targets. The width of each link or sub-link is negotiated at the initialization of each peripheral. At the end-point, the data that can be viewed as a byte stream are assembled/disassembled into the different lanes by the physical layer.

Given the high bandwidth and flexibility of the PCIe as an interconnect, it appears an unnecessary limitation to confine target devices to the physical location of an expansion card that is inserted into a PCIe slot of a computer. Rather, given space constraints as well as power and thermal management concerns, it would be advantageous to have target devices moved away from the motherboard and provide a high speed data link (HSDL) via dedicated cabling between an adapter card and the peripheral target device. U.S. Published Patent Application No. 2008/0244141 shows such a configuration using a dedicated PCIe expansion cable in pass-through mode. Likewise, a dedicated PCIe cable form factor has been defined by the PCI Express Special Interest Group (PCIeSIG) to allow creation of easy to install PCIe devices without limitations by form factor constraints. In either case, the cable receptacle is either a dedicated port on the motherboard requiring potentially costly redesign of the motherboard, or the interface is located on a dedicated expansion card to facilitate the integration of the PCIe cable. However, in order to satisfy electrical specifications, including length to connect to peripheral devices at a substantial distance (up to 25 ft (8 meters)) from the host system, the cable itself requires a bulky design which adds undesirable cost.

In view of the above, PCIe devices in their current form, including the integration of all components and necessary cooling, as for example in the case of graphics cards, are limited by rigid design specifications. These constraints, including thermal and power envelope as well as space requirements, complicate the ability to provide flexible implementations of devices that connect to a computer system through a PCIe interface. As such, it would be desirable to enable functional interfacing of a PCIe device with a PCIe bus, but allowing for the device to be located remote from the PCIe interface on the motherboard, and more preferably without the requirement that the device occupies internal space within the computer enclosure.

BRIEF DESCRIPTION OF THE INVENTION

The present invention provides a PCIe bus extension system, method, interface card and cable for connecting a PCIe-compliant peripheral device to a PCIe bus of a computer system.

According to a first aspect of the invention, a method of connecting a PCIe-compliant peripheral device to a PCIe bus of a computer system includes installing a PCIe interface card in an enclosure of the computer system. The PCIe interface card is installed to have an edge connector thereof functionally connected with a motherboard within the enclosure, the PCIe interface card having a logic integrated circuit to functionally connect PCIe signals transmitted from the motherboard to an interface port on the PCIe interface card and functionally connect PCIe signals transmitted from the interface port to the motherboard. A PCIe-compliant peripheral device is then connected to the PCIe interface card with a cable configured for complete crossover of all of the PCIe signals. The cable is connected to the interface port of the PCIe interface card and to an interface port of the PCIe-compliant peripheral device that is functionally identical to the interface port on the PCIe interface card, but with a mirror-symmetric pinout to receive clock and data signals from the PCIe interface card and to send data signals to the PCIe interface card. The PCIe signals are then transmitted between the motherboard and the PCIe-compliant peripheral device through the cable and the interface port on the PCIe interface card. The PCIe signals are transmitted over multiple parallel PCIe lanes to define a single channel transferred over the cable in full duplex mode. The PCIe-compliant peripheral device does not receive power through the PCIe interface card or cable.

According to a second aspect of the invention, a PCIe bus extension system for connecting a PCIe-compliant peripheral device to a PCIe bus of the computer system includes a PCIe interface card within an enclosure of the computer system. The PCIe interface card has at least one interface port and an edge connector configured to interface with a PCIe expansion slot. The connector is functionally connected with a motherboard within the enclosure. The PCIe interface card further has a logic integrated circuit that functionally connects PCIe signals transmitted from the motherboard to the interface port and functionally connects PCIe signals transmitted from the interface port to the motherboard. The extension system further includes a PCIe-compliant peripheral device having an interface port that is functionally identical to the interface port on the PCIe interface card, but with a mirror-symmetric pinout to receive clock and data signals from the PCIe interface card and to send data signals to the PCIe interface card. A cable connects the interface port of the PCIe interface card to the interface port of the PCIe-compliant peripheral device. The cable is configured for complete crossover of all of the PCIe signals and the interface port of the PCIe interface card is adapted to transmit the PCIe signals over multiple parallel PCIe lanes to define a single channel transferred over the cable in full duplex mode. However, the PCIe-compliant peripheral device does not receive power through the PCIe interface card or the cable.

Another aspect of the invention is a PCIe interface card for a PCIe bus of a computer system. The PCIe interface card includes a printed circuit board, an edge connector adapted for insertion into a PCIe expansion slot on a motherboard of the computer system for transmitting PCIe signals between the motherboard and the PCIe interface card, an interface port configured to mate with a connector of a cable, and a logic integrated circuit on the printed circuit board, the logic integrated circuit functionally connecting the edge connector with the interface port and amplifying and propagating clock and data PCIe signals therebetween that are compliant with a PCIe standard. The interface port of the PCIe interface card is adapted to communicate the clock and data PCIe signals of multiple PCIe lanes in full duplex mode to a PCIe-compliant peripheral device when connected by a cable to the interface port of the PCIe interface card through an interface port of the PCIe-compliant peripheral device that has a mirror-symmetric pinout to the interface port of the PCIe interface card but lacks means for transmitting power therethrough.

According to the above, the invention is adapted to use a cable that provides a functional interconnect high speed data link (HSDL) channel through which all signals of multiple parallel lanes of data are transferred in full duplex mode between the PCIe interface card and a PCIe-compliant peripheral device. According to a preferred aspect of the invention, this capability is able to provide a scaled-down, inexpensive solution for interconnecting the PCIe bus on a standard motherboard with one or more PCIe-compliant peripheral devices that may be within an enclosure of the computer system but remote from a motherboard within the enclosure, or external but in close proximity to the enclosure.

Other aspects and advantages of this invention will be better appreciated from the following detailed description.

BRIEF DESCRIPTION OF THE DRAWINGS

FIG. 3 schematically represents a functional diagram of a PCIe bus extension system similar to that of FIG. 1, further configured to arbitrate a single channel through a PCIe switch over multiple mini SA 4i interface ports.

DETAILED DESCRIPTION OF THE INVENTION

The Figures represent certain aspects of a system capable of providing flexible configurations for connecting PCIe-compliant peripheral devices to a host computer system using a cable that connects the peripheral devices to a PCIe bus on a motherboard of the computer system. As known in the art, the PCIe protocol allows for concurrent send and receive transfers over dedicated differential signaling pairs of wires in full duplex mode. PCIe signals are routed from a PCIe expansion slot on the motherboard through a PCIe interface (expansion) card via an edge connector of the interface card. The edge connector of the PCIe interface card typically uses a 4-lane interface, though other interface configurations such as PCIe x1, x8 or x16 are possible. As will be discussed in more detail below, the system is advantageously able to make use of standard and relatively low-cost cables and connectors that are mounted on an adapted circuit board so that the pinout connectivity on the interface card and peripheral device have a mirrored configuration.

Figure 1:
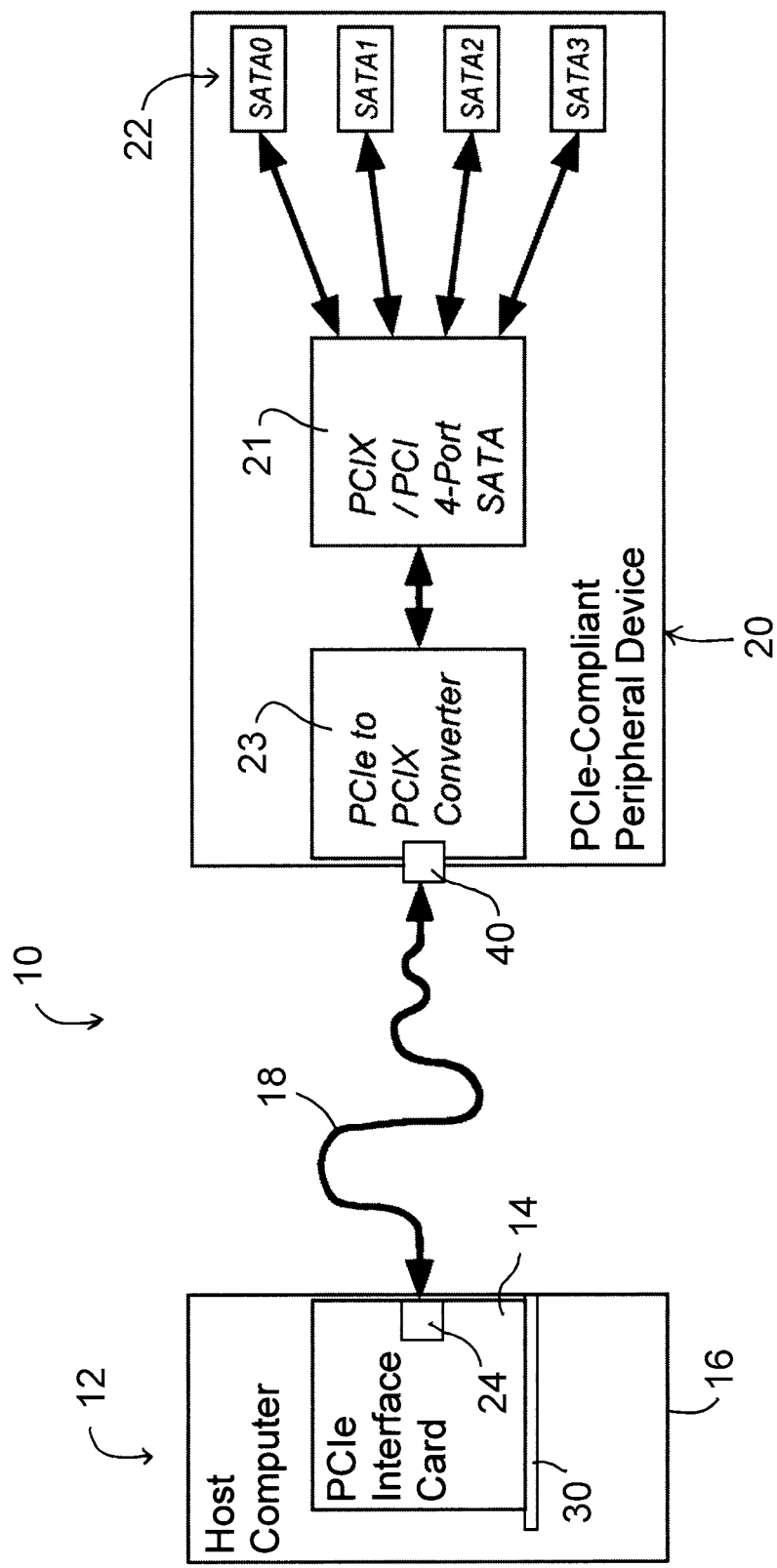
FIG. 1 schematically represents a functional diagram of a PCIe bus extension system, in which a PCIe interface card is installed in a host computer and connected with a cable to a PCIe-compliant peripheral device containing four solid-state drives in accordance with an embodiment of the invention.

FIG. 1 schematically represents a PCIe bus extension system 10 according to an embodiment of the invention. The system 10 is represented as being used with a host computer 12 and as including a PCIe interface card 14 that has been installed within an enclosure 16 in the computer 12. The interface card 14 is connected with a cable 18 to one of any number of PCIe-compliant peripheral devices 20 that are compatible with PCIe technology. In the embodiment of FIG. 1, the peripheral device 20 is represented as including a Serial ATA (SATA)-based solid state drive (SSD) controller 21 for controlling four solid-state drives (SSDs) 22. The interface card 14 and cable 18 are preferably configured to provide a high speed data link (HSDL) between the computer 12 and the peripheral device 20.

Particularly preferred PCIe-compliant peripheral devices 20 include NAND flash-based mass storage devices capable of interfacing with a PCIe bus through suitable logic. More generally, the peripheral devices 20 can be PCIe first generation or second generation compliant, preferably using a 5 gbps (PCIe 2.x compliant) data rate. As represented in FIG. 1, a nonlimiting example of a suitable logic is a four-port PCI-based SATA controller 21 that fans out into the four SATA SSDs 22, which may comprise an array of NAND flash-based mass storage devices located at the back end of the logic. The SATA controller 21 serves as host bus adapter for the SATA SSDs 22 used as the permanent storage media. As represented in FIG. 1, the PCIe signals can be converted into PCI-X signals with a converter 23, for example, using a Pericom PI7C9X130PCI Express to PCI-X Reversible Bridge, which then connects to the SATA controller 21. Other mapping strategies and non-volatile memory technologies could be used.

Figure 2A:
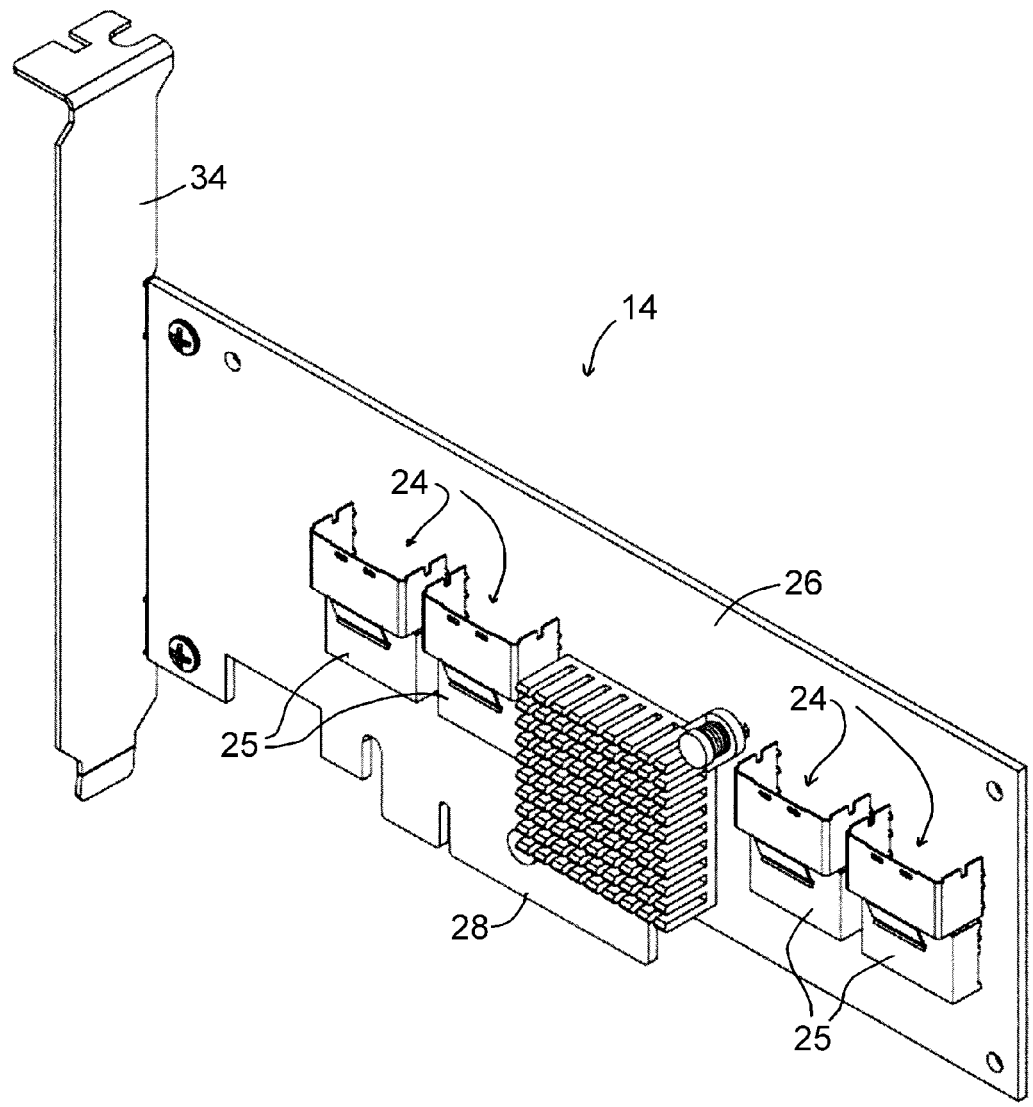
FIG. 2A represents a PCIe interface card of a type suitable for use in the PCIe bus extension system of FIG. 1, in which the interface card is equipped with four female mini-SAS 4i connectors in accordance with an embodiment of the invention.
Figure 2B:
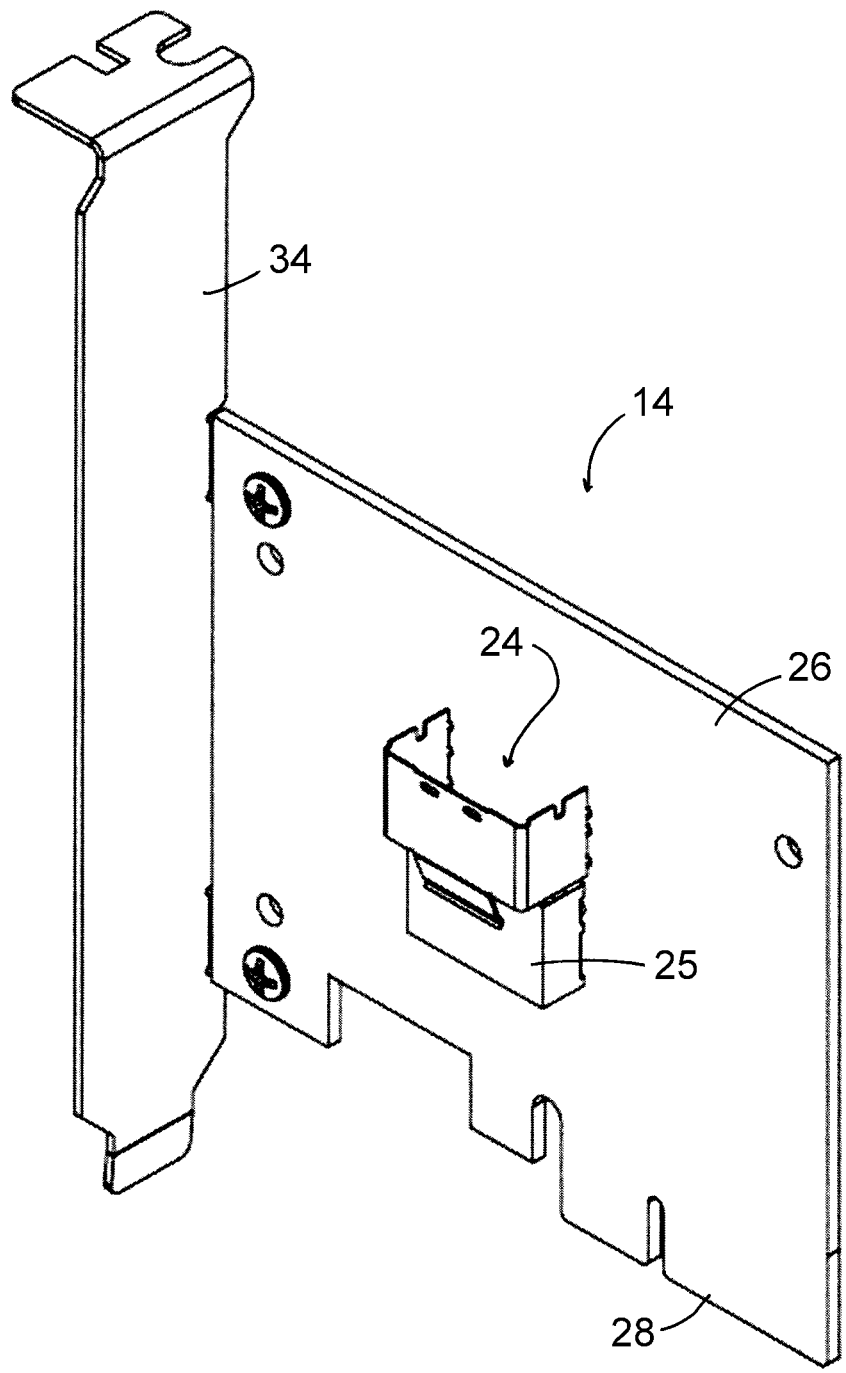
FIG. 2B represents a PCIe interface card similar to that of FIG. 2A, but equipped with a single female mini-SAS 4i connector in accordance with another embodiment of the invention.

FIGS. 2A and 2B represent two embodiments of the PCIe interface card 14 of FIG. 1. In FIG. 2A, the interface card 14 is equipped with four interface ports 24, whereas the card 14 represented in FIG. 2B is equipped with a single interface port 24. Each card 14 comprises a printed circuit board 26, a bracket 34 for mounting the circuit board 26 within the computer enclosure 16, and an edge connector 28 configured to connect the interface card 14 with a PCIe expansion slot (not shown) on a motherboard 30 mounted within the enclosure 16 (FIG. 1). Alternatively, it is foreseeable that the connector 28 could be functionally connected to the PCIe expansion slot on the motherboard 30 through a PCIe riser card (not shown) within the enclosure 16.

Figure 2C:
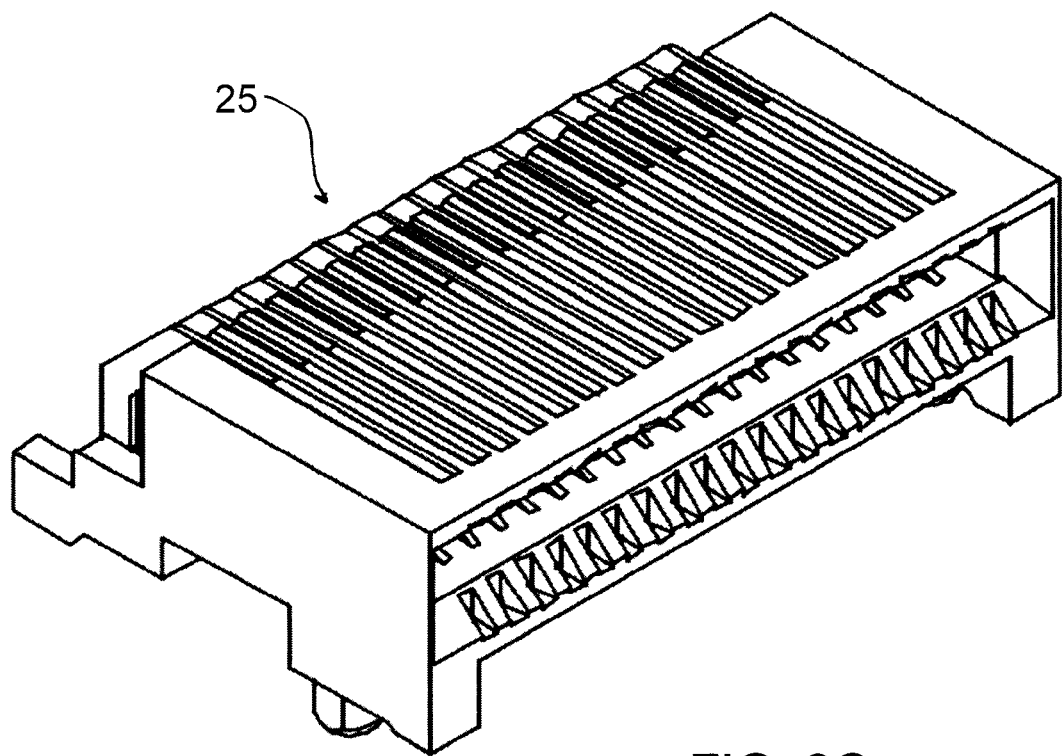
FIG. 2C represents a more detailed view of a female mini-SAS 4i connector of the type shown as being mounted on the PCIe interface cards of FIGS. 2A and 2B.
Figure 2D:
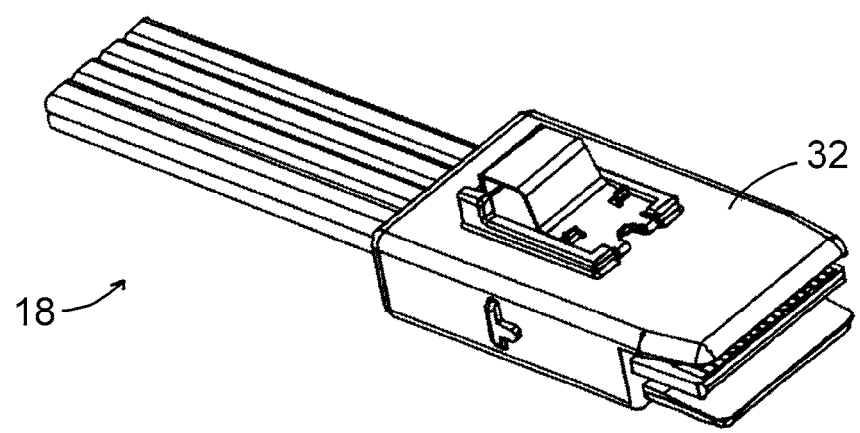
FIG. 2D represents a cable of a type suitable for use in the PCIe bus extension system of FIG. 1, in which the cable has a complementary male mini-SAS 4i connector configured for connecting with the female mini-SAS 4i connectors of FIGS. 2A through 2C.

FIG. 2C provides a more detailed view of a female connector 25 that forms part of each interface port 24 on the interface cards 14 of FIGS. 2A and 2B, and FIG. 2D represents one end of the cable 18 and a male connector 32 affixed thereto for connecting to the female connector 25 of the interface card 14. The female connector 25 and its complementary male connector 32 are preferably compliant with Small Form Factor (SFF) committee specifications SFF-8086 (currently Rev 2.3) and SFF-8087 (currently Rev. 2.4), which specify what is generally known as the mini Serial Attached SCSI (SAS) form factor, including the form factor known as mini-SAS 4i (wide compact internal connector). As such, the term "mini-SAS" is used herein to define connectors that meet the SFF-8086 and SFF-8087 specifications, and particular example of which is the mini-SAS 4i form factor. Additionally, the cable 18 can be an SFF-8087 compliant internal straight termination cable. As such, the connectors 25 and 32 and the cable 18 can be referred to as mini-SAS connectors and cable, though it should be understood that other types of connectors and cables could be developed and for use with the invention that are compatible with PCIe technology. As mini-SAS connectors, each connector 25 has up to four differential signaling pairs for both transmitting and receiving data, along with a differential reference clock signal pair, a fundamental reset and an I2C interface for serial clock and data. In the form of a mini-SAS cable, the cable 18 is configured to have a "backplane to controller" pinout to achieve complete crossover of all signals, in other words, all thirty-six signals of a mini-SAS 4i connectors cross over. The cable 18 should meet or exceed the electrical specifications defined in the SAS-1.1 standard, and typically will be limited to lengths of about 0.5 meter (about 20 inches). Notably, power is not transferred from the motherboard 30 to the peripheral devices 20 through the connectors 25 of the interface ports 24. Mini-SAS connectors and cables are known in the art and therefore, aside from the above, will not be discussed in any further details.

In view of the above, the interconnection between the PCIe interface card 14 and the PCIe-compliant peripheral device 20 of FIG. 1 is made through an extension of the PCIe bus of the motherboard 30 using a flexible cable 18 that can be of a type that is commercially available ("off-the-shelf") and conforms to existing industry standards. In the example given, the cable 18 is a standard mini-SAS 4i cable having male connectors 32 at each end that are configured for mating with a female connector 25 of the interface card 14 and a similar-configured female connector of a PCIe interface port 40 of the peripheral device 20. PCIe functionality and protocol can be maintained throughout the entire configuration so that the interconnection is completely transparent to the host computer 10. In other words, the host computer 10 does not know whether the peripheral devices 20 are connected through the cable 18 or plugged directly into the PCIe interface slot on the motherboard 30.

Based on the configuration of the system 10 and cards 14 discussed above, the interface card 14 serves to connect the signal traces of the PCIe expansion slot on the motherboard 30 to the PCIe-compliant peripheral device 20, and in particular the control, data and clock signals transmitted between the motherboard 30 and the SSDs 22 controlled by the four-port SATA controller 21. In the embodiment of FIG. 1, the interface card 14 connects four PCIe lanes originating on the motherboard 30 to four PCIe lanes in the interface port 24, from where they are transferred through the cable 18 to the receiving port 40 on the peripheral device 20. On the interface card 14, possible signal attenuation and delays stemming from the use of the cable 18 can be compensated for by the use of an integrated PCIe re-driver integrated circuit (not shown) of a type known in the art.

FIG. 1 represents the simplest case, in which the four PCIe lanes are physically combined into a single HSDL channel formed by the cable 18, resulting in the PCIe signals being transmitted over the cable 18 in full duplex mode. The data traces can be routed through the re-driver IC, which acts as a transmit/receive amplifier between the edge connector and the upstream female connectors 25. FIG. 3 represents a situation in which the four PCIe lanes from the motherboard 30 are split over four HSDL channels with four PCIe lanes, each of which uses a PCIe switch 42 on the interface card 14 to arbitrate the signals for a total of sixteen PCIe lanes over the four interface ports 24. Each interface port 24 then connects via a cable 18 to one of the ports 40 on the peripheral devices 20. Typically, the peripheral devices 20 will have their own intrinsic latencies, especially if they are NAND flash-based storage devices with access latencies in the order of 100 to 200 μsec. The arbitration latencies of the PCIe switch 42, typically on the order of 150 ns or less, will not constitute any significant bottleneck.

Figure 4:
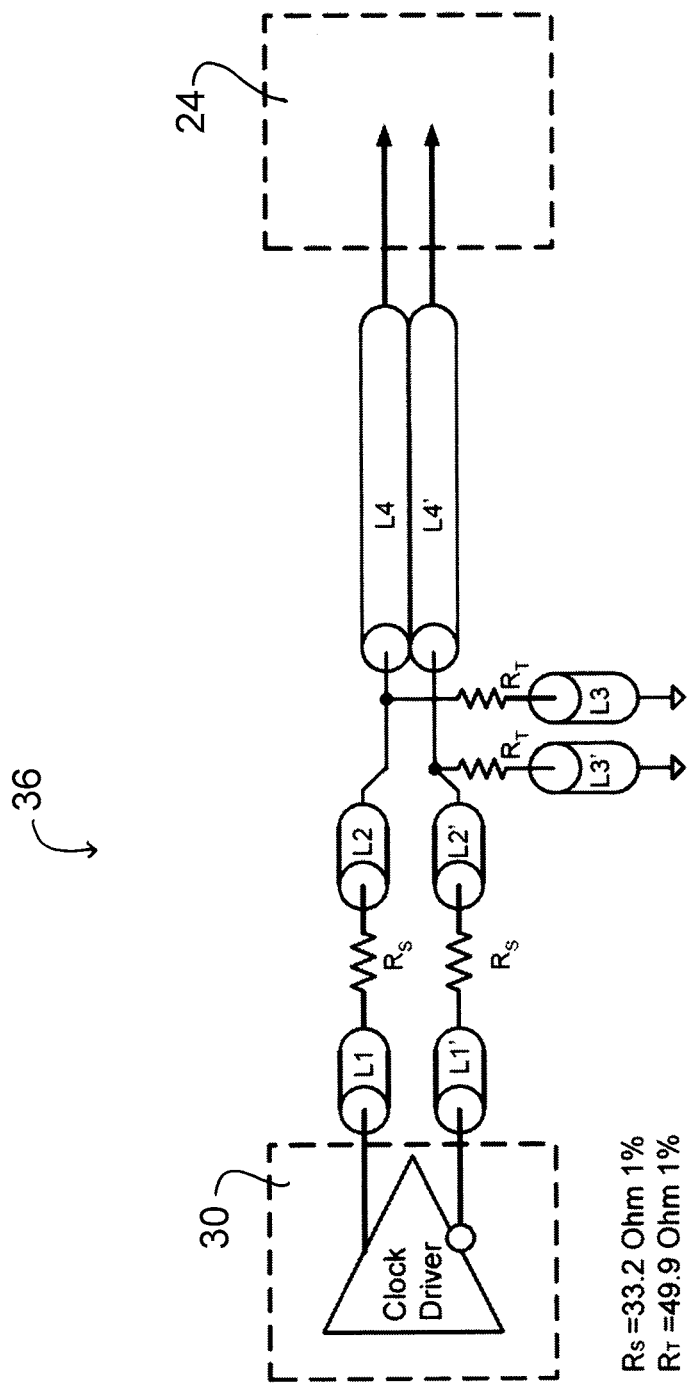
FIG. 4 schematically represents a clock forwarding scheme suitable for use with PCIe bus extension system of FIG. 1.

FIG. 4 represents a clock forwarding scheme suitable for use with PCIe bus extension system of FIG. 1. In the illustrated example, the reference clock signal acquired from the motherboard 30 can be amplified through a zero-delay clock buffer 36 and forwarded to one or more interface ports 24 of the interface card 14 using high speed current steering logic (HCSL), which in the embodiment of FIG. 4 includes an in-series resistor of about 33.2 Ohms and a termination to ground resistor of about 49.9 Ohm (both 1% tolerance).

In addition to the PCIe clock and data signals, 120 interface serial clock (SCL) and data (SDA) are routed through the mini-SAS connectors 25 and 32. Furthermore, a device present input can be established through a dedicated PRESENT# pin and a fundamental reset (PERST#) output can be used to reset a peripheral device 20. In the preferred embodiment, pulling the PRESENT# low to indicate the presence of a device 20 can be used to generate a visual indicator of the electrical connection of the device 20 to the interface card 14 in form of an LED.

A complete listing of the pinout (pin layout) of a female mini-SAS i4 connector used as the connector 25 of the interface port 24 on the interface card 14 is given in Table 1.

TABLE 1

HOST SIDE CONNECTOR PINOUT

| Pin # | Pin Name | Pin # | Pin Name |
|---|---|---|---|
| A1 | GROUND | B1 | GROUND |
| A2 | PETp0 | B2 | PERp0 |
| A3 | PETn0 | B3 | PERn0 |
| A4 | GROUND | B4 | GROUND |
| A5 | PETp1 | B5 | PERp1 |
| A6 | PETn1 | B6 | PERn1 |
| A7 | GROUND | B7 | GROUND |
| A8 | GROUND | B8 | PERST# |
| A9 | REFCLK+ | B9 | PRESENT# |
| A10 | REFCLK− | B10 | SCL |
| A11 | GROUND | B11 | SDA |

TABLE 1-continued

HOST SIDE CONNECTOR PINOUT

| Pin # | Pin Name | Pin # | Pin Name |
|---|---|---|---|
| A12 | GROUND | B12 | GROUND |
| A13 | PETp2 | B13 | PERp2 |
| A14 | PETn2 | B14 | PERn2 |
| A15 | GROUND | B15 | GROUND |
| A16 | PETp3 | B16 | PERp3 |
| A17 | PETn3 | B17 | PERn3 |
| A18 | GROUND | B18 | GROUND |

The pinout of a female mini-SAS i4 connector used as the interface port 40 of the peripheral devices 20 is given in Table 2.

TABLE 2

DRIVE SIDE CONNECTOR PINOUT

| Pin | Pin Name | Pin | Pin Name |
|---|---|---|---|
| A1 | GROUND | B1 | GROUND |
| A2 | PERp0 | B2 | PETp0 |
| A3 | PERn0 | B3 | PETn0 |
| A4 | GROUND | B4 | GROUND |
| A5 | PERp1 | B5 | PETp1 |
| A6 | PERn1 | B6 | PETn1 |
| A7 | GROUND | B7 | GROUND |
| A8 | PERST# | B8 | GROUND |
| A9 | PRESENT | B9 | REFCLK |
| A10 | SCL | B10 | REFCLK− |
| A11 | SDA | B11 | GROUND |
| A12 | GROUND | B12 | GROUND |
| A13 | PERp2 | B13 | PETp2 |
| A14 | PERn2 | B14 | PETn2 |
| A15 | GROUND | B15 | GROUND |
| A16 | PERp3 | B16 | PETp3 |
| A17 | PERn3 | B17 | PETn3 |
| A18 | GROUND | B18 | GROUND |

The definitions for the pin names (signals) identified in Tables 1 and 2 are provided in Table 3. For all differential pairs, "p" is positive and "n" is negative.

TABLE 3

PIN DEFINITIONS

| Pin Name | Direction | Definition |
|---|---|---|
| PETp0/PETn0 | I | Transmitter differential pair, Lane 0 |
| PETp1/PETn1 | I | Transmitter differential pair, Lane 1 |
| PETp2/PETn2 | I | Transmitter differential pair, Lane 2 |
| PETp3/PETn3 | I | Transmitter differential pair, Lane 3 |
| PERp0/PERn | O | Receiver differential pair, Lane 0 |
| PERp1/PERn | O | Receiver differential pair, Lane 1 |
| PERp2/PERn | O | Receiver differential pair, Lane 2 |
| PERp3/PERn | O | Receiver differential pair, Lane 3 |
| REFCLK+/− | O | Reference Clock differential pair |
| PERST# | O, OD | Fundamental reset (low true) |
| PRESENT# | I, OD | Drive present indicator (low true) |
| SCL | O, OD | I2C interface serial clock |
| SDA | I/O, OD | I2C interface serial data |
| GROUND |  | System digital ground |

*I = input to host system
O = output from host system
I/O = bidirectional signal
OD = open drain While certain components have been disclosed for the PCIe bus extension system of this invention, it is foreseeable that functionally-equivalent components could be used or subsequently developed to perform the intended functions of the disclosed components. For example, future PCIe standards may require higher pin count connectors that would have to be addressed by the HSDL channel connectors and cables. Furthermore, future revisions of high speed data link (HSDL) technology will embrace PCIe 3.x and future revisions of the PCIe standard. Therefore, while the invention has been described in terms of particular embodiments, it is apparent that other forms could be adopted by one skilled in the art, and the scope of the invention is to be limited only by the following claims.

The invention claimed is:

1. A method of connecting a PCIe-compliant peripheral device to a PCIe bus of a computer system, the method comprising:
installing a PCIe interface card in an enclosure of the computer system,
the PCIe interface card being installed to have an edge connector thereof functionally connected with PCIe expansion slot on a motherboard within the enclosure, the PCIe interface card having a logic integrated circuit to functionally connect PCIe signals transmitted from the motherboard to an interface port on the PCIe interface card and functionally connect PCIe signals transmitted from the interface port to the motherboard;
connecting a PCIe-compliant peripheral device to the PCIe interface card with a cable configured for complete crossover of all of the PCIe signals, the cable being connected to the interface port of the PCIe interface card and to an interface port of the PCIe-compliant peripheral device that is functionally identical to the interface port on the PCIe interface card but with a mirror-symmetric pinout to receive clock and data signals from the PCIe interface card and to send data signals to the PCIe interface card;
transmitting the PCIe signals between the motherboard and the PCIe-compliant peripheral device through the cable and the interface port on the PCIe interface card, wherein multiple parallel lanes of the PCIe signals are transferred over the cable as a single channel in full duplex mode; and
wherein the PCIe-compliant peripheral device does not receive power through the PCIe interface card or cable.

2. The method of claim 1, wherein the PCIe interface card comprises a re-driver circuit and a zero-delay clock buffer that amplifies and forwards the clock and data signals to the interface port.

3. The method of claim 1, further comprising operating a PCIe switch to arbitrate between the clock and data signals of the multiple parallel PCIe lanes over the channel and additional clock and data signals of additional multiple parallel PCIe lanes over at least one additional channel provided by at least one additional cable.

4. The method of claim 1, wherein the interface port on the PCIe interface card and the interface port on the peripheral device are mini-SAS 4i connectors and the channel comprises four PCIe lanes.

5. The method of claim 1, wherein the edge connector of the PCIe interface card is physically connected to the PCIe expansion slot on the motherboard.

6. The method of claim 1, wherein the edge connector of the PCIe interface card is functionally connected to the PCIe expansion slot on the motherboard through a PCIe riser card within the enclosure.

* * * * *